United States Patent
Stevenson et al.

(10) Patent No.: US 6,900,569 B2
(45) Date of Patent: May 31, 2005

(54) INCREASED TORQUE IN RETARDER BRAKE SYSTEM THROUGH USE OF CONDUCTIVE LAYER

(75) Inventors: Randy C. Stevenson, Saline, MI (US); Zhesheng Li, Dearborn Heights, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 230 days.

(21) Appl. No.: 10/244,989

(22) Filed: Sep. 16, 2002

(65) Prior Publication Data

US 2004/0051414 A1 Mar. 18, 2004

(51) Int. Cl.[7] .................... H02K 49/00; H02K 49/02; H02K 5/00; H02K 1/12; H02K 1/22

(52) U.S. Cl. .................... 310/105; 310/93; 310/254; 310/261

(58) Field of Search .................... 310/105, 93, 254, 310/261

(56) References Cited

U.S. PATENT DOCUMENTS

| | | | |
|---|---|---|---|
| 2,428,104 A | 9/1947 | Winther | 172/284 |
| 2,971,105 A | 2/1961 | Jaeschke | 310/105 |
| 3,162,783 A | 12/1964 | Zozulin | 310/105 |
| 3,184,626 A * | 5/1965 | Luenberger | 310/96 |
| 3,365,598 A | 1/1968 | Jaeschke | 310/105 |
| 4,379,242 A * | 4/1983 | MacDonald | 310/105 |
| 4,398,111 A * | 8/1983 | Zuch | 310/93 |
| 4,900,956 A * | 2/1990 | Gavilondo et al. | 310/61 |
| 4,937,483 A | 6/1990 | Matsui et al. | 310/105 |
| 5,054,587 A * | 10/1991 | Matsui et al. | 188/267 |
| 5,064,029 A * | 11/1991 | Araki et al. | 188/267 |
| 5,986,370 A | 11/1999 | Cheng | 310/77 |
| 6,025,664 A | 2/2000 | Kuwahara | 310/77 |
| 6,039,157 A | 3/2000 | Yamada et al. | 188/158 |
| 6,062,350 A | 5/2000 | Spieldiener et al. | 188/161 |
| 6,459,184 B1 * | 10/2002 | Ozeki | 310/93 |
| 6,531,801 B1 * | 3/2003 | Blazek et al. | 310/261 |
| 6,548,929 B2 * | 4/2003 | Nelson et al. | 310/105 |
| 6,700,265 B1 * | 3/2004 | Bouissou | 310/105 |

FOREIGN PATENT DOCUMENTS

| | | |
|---|---|---|
| EP | 0 312 601 | 4/1989 |
| EP | 0 341 308 | 11/1989 |
| GB | 518863 | 3/1940 |
| GB | 528293 | 10/1940 |
| GB | 841493 | 7/1960 |
| GB | 877315 | 9/1961 |
| GB | 877437 | 9/1961 |
| JP | 2000116109 A2 | 4/2000 |
| JP | 2001037202 A2 | 2/2001 |

* cited by examiner

Primary Examiner—Darren Schuberg
Assistant Examiner—Julio C. Gonzalez
(74) Attorney, Agent, or Firm—Brinks Hofer Gilson & Lione

(57) ABSTRACT

Electromagnetic retarder brake systems, and methods for their use, are provided utilizing specified thickness conductive layers. The specified thickness of the conductive layer in each system is determined to obtain a certain desired torque at a certain desired low rotational frequency. The specified thickness conductive layer is disposed between a winding and a rotor within each system. By utilizing a specified thickness conductive layer, torque on the rotor at low rotational frequencies is increased, thereby improving deceleration capabilities.

17 Claims, 5 Drawing Sheets

INCREASED TORQUE IN RETARDER BRAKE SYSTEM THROUGH USE OF CONDUCTIVE LAYER

BACKGROUND OF THE INVENTION

Vehicles typically use brakes and other retarding systems to help brake and decelerate. However, the drum or disc systems utilized by most brakes and retarding systems tend to wear down periodically, necessitating expensive repairs.

To help avoid the necessity for expensive repairs due to the wearing down of drum or disc systems, some vehicles use electromagnetic retarder brake systems to help brake and decelerate. Typically, an electromagnetic retarder consists of a stator having an array of field windings that generate a magnetic field, and a solid metal rotor in which the magnetic field from the stator induces eddy currents. The eddy currents generate heat due to the finite conductivity of the metal of the rotor. This heat loss then produces a retarding torque. Only the relative motion between the stator and rotor is important. If there is no relative motion, there is no retarding torque generated.

An electromagnetic retarder brake system and method for its use is sought to increase the retarding torque at low rotor rotation frequencies (speeds) to improve the decelerating ability of the system down to zero speed. Further, it is a goal to be able to control the amount of increased torque and the speed at which the increased torque occurs by adjusting components in the system.

BRIEF SUMMARY OF THE INVENTION

It is in general an object of this invention to utilize specified thickness of conductive layers in electromagnetic retarder brake systems to increase torque on a rotor at low rotational frequencies. It is also generally an object of this invention to determine the specified thickness of the conductive layer in each system to obtain a certain desired torque at a certain desired low rotational frequency.

In one aspect, an eddy current braking system in a vehicle comprises a rotor defining a generally cylindrical inner pocket extending axially along the rotor, a stator assembly comprising a winding at least partially disposed within the generally cylindrical inner pocket of the rotor, and a conductive layer having a specified thickness disposed between an inner surface of the rotor and the winding. The winding is capable of inducing a magnetomotive force capable of slowing rotation of the rotor. The specified thickness of the conductive layer is determined to obtain a certain desired torque at a certain desired low rotational frequency.

In another aspect, a method of obtaining a certain desired torque at a certain desired low rotational frequency in an eddy current braking system in a vehicle is disclosed. First, an eddy current braking system is provided. The eddy current braking system comprises a rotor defining a generally cylindrical inner pocket extending axially along the rotor, a stator assembly comprising a winding at least partially disposed within the generally cylindrical inner pocket of the rotor, and a conductive layer having a specified thickness disposed between an inner surface of the rotor and the winding. The winding is capable of inducing a magnetomotive force that is capable of slowing rotation of the rotor. Next, a certain desired torque at a certain desired low rotational frequency is determined. Then, the specified thickness of the conductive layer is determined to obtain the certain desired torque at the certain desired low rotational frequency. Finally, the conductive layer having the determined specified thickness is applied to obtain the certain desired torque at the certain desired low rotational frequency.

The present invention, together with further objects and advantages, will be best understood by reference to the following detailed description taken in conjunction with the accompanying drawings.

DETAILED DESCRIPTION OF THE INVENTION

Figure 1:
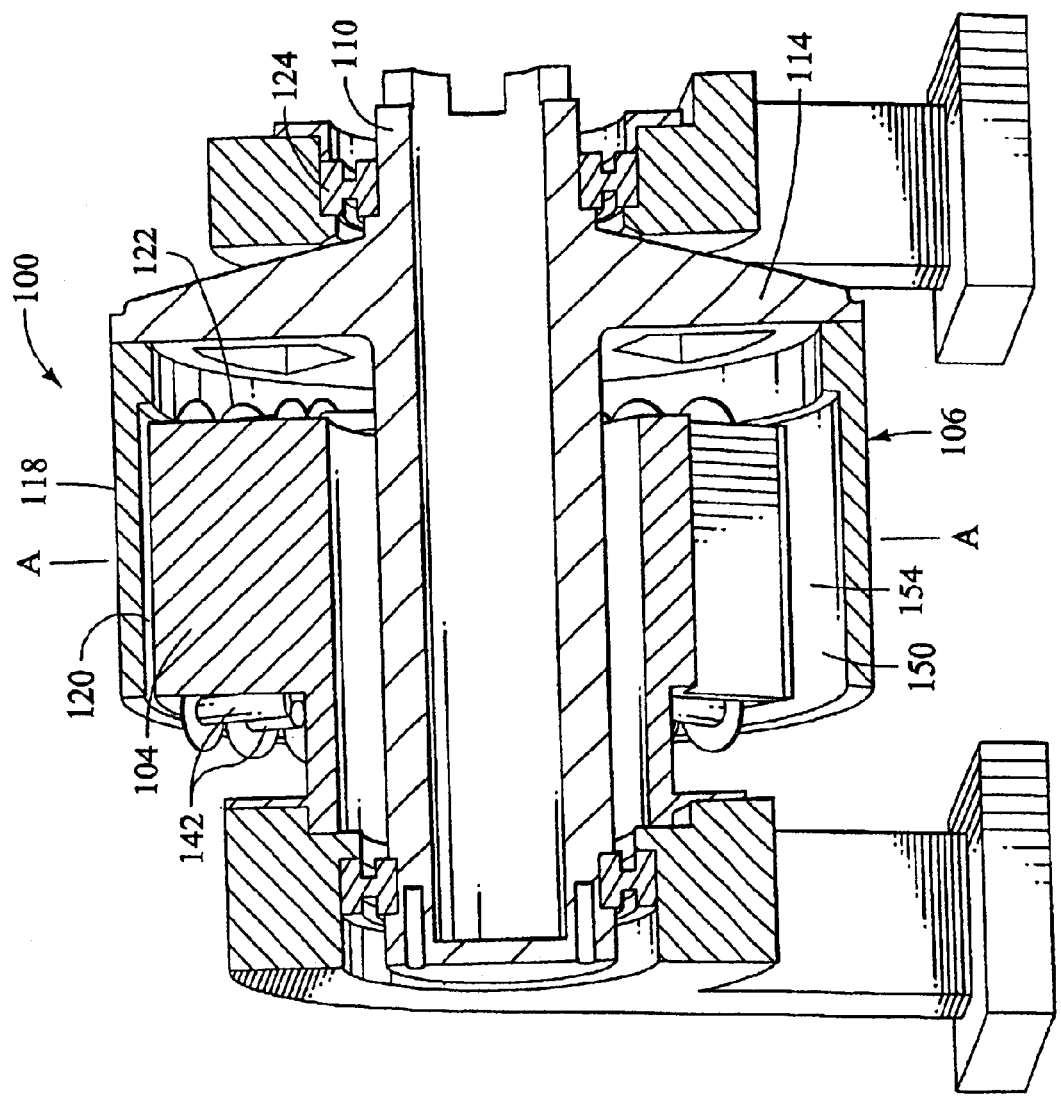
FIG. 1 is a cross-section schematic taken through a mid-section of electromagnetic retarder brake.
Figure 2:
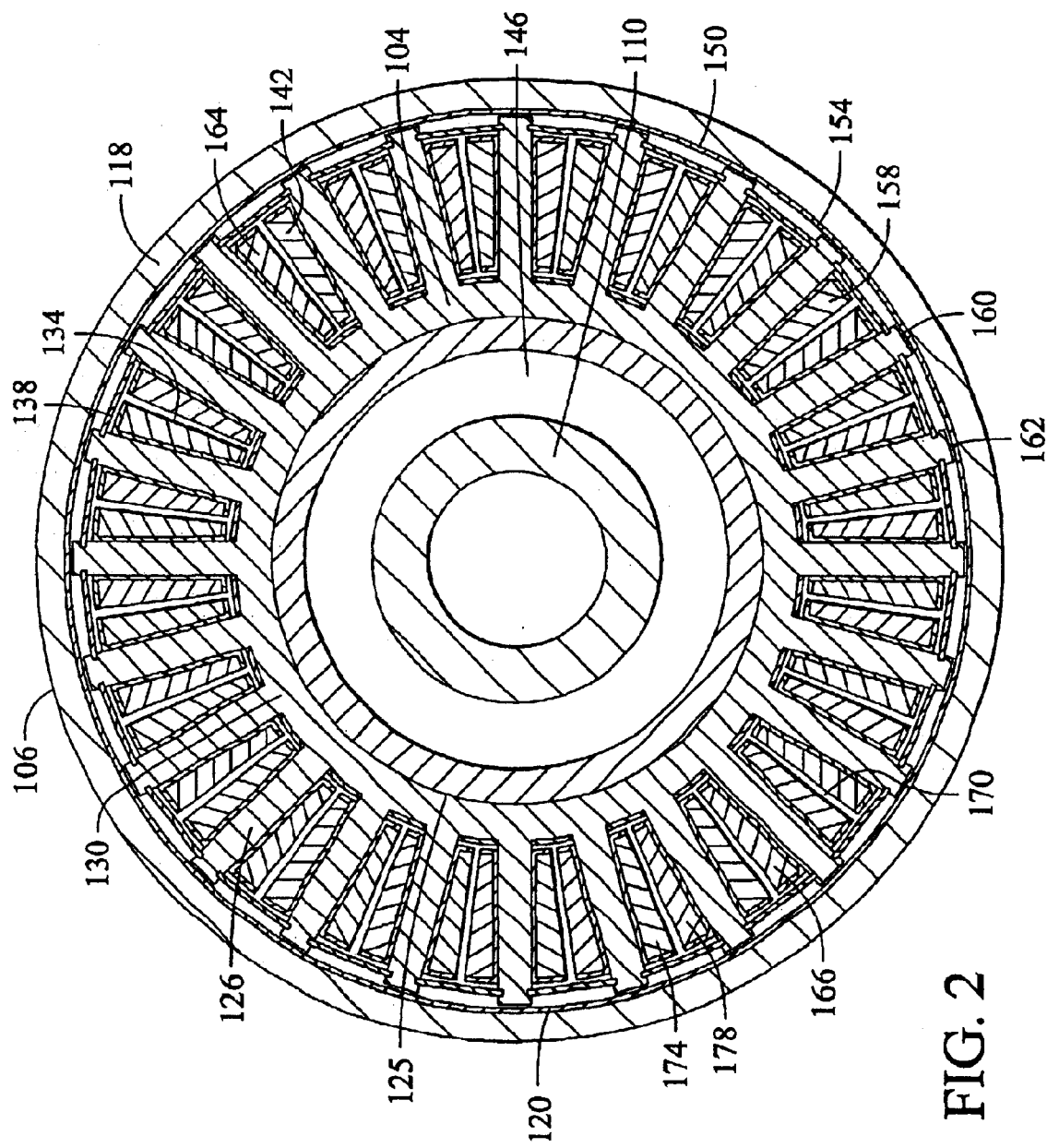
FIG. 2 is a cross-section schematic through the rotor portion A—A in the electromagnetic retarder brake of FIG. 1.

FIGS. 1 and 2 represent different views of one embodiment of an electromagnetic retarder brake 100, also referred to throughout this application as an eddy current braking system. The eddy current braking system 100 may be used in a vehicle. FIG. 1 represents a vertically running cross-section schematic taken through a mid-section of the electromagnetic retarder brake 100. FIG. 2 represents a cross-section schematic through the rotor portion A—A in the electromagnetic retarder brake 100 of FIG. 1. In other embodiments, the electromagnetic retarder brake 100 may have other configurations and arrangements including those with fewer and additional components.

The electromagnetic retarder brake 100 has a stator assembly 104 and a rotor 106. The rotor 106 comprises a generally cylindrical inner shaft 110, webbed arms 114 extending outwardly from the shaft 110, and a generally cylindrical outer housing 118 connected to the webbed arms 114. A generally cylindrical inner surface 120 extends around the inner portion of the generally cylindrical outer housing 118. Defined between the generally cylindrical inner shaft 110 and the generally cylindrical outer housing 118 is a generally cylindrical inner pocket 122 extending axially along the rotor 106. The rotor 106 is attached to a bearing 124 which allows it to rotate. The bearing 124 may be a variety of types including a ball bearing. The rotor 106 is one-piece and preferably made out of iron. The rotor 106 may be operable to generate an armature magnetomotive force.

The stator assembly 104 comprises a generally cylindrical inner section 125, and staggered outwardly extending stator arms 126 connected to and extending around the circumference of an outer-surface 130 of the generally cylindrical inner section 125. Inner compartments 134, staggered around the circumference of the outer-surface 130 and extending both radially and axially, are defined by the outer surface 130 and the staggered outwardly extending stator arms 126. Running within the inner compartments 134 are generally cylindrical bobbins 138. The stator assembly 104 further comprises a field winding 142, disposed within the inner compartments 134, which is wound around the generally cylindrical bobbins 138, and around each stator arm 126. The field winding 142 may be a round wire or a rectangular wire. The stator assembly is preferably one-piece and made of iron.

At least a portion of the stator assembly 104 is within the cylindrical inner pocket 122 of the rotor 106. The generally cylindrical inner section 125 of the stator assembly 104 extends around the generally cylindrical inner shaft 110 of the rotor 106 and extends axially along the rotor 106. At least some of the staggered outwardly extending stator arms 126 of the stator assembly 104 are disposed within the cylindrical inner pocket 122 of the rotor. The stator arms 126 extend radially from the circumference of the outer-surface 130 of the generally cylindrical inner section 125 of the stator assembly 104 and end prior to reaching the generally cylindrical inner surface 120 of the rotor 106.

A bearing 146 is disposed between the generally cylindrical inner shaft 110 of the rotor 106 and the generally cylindrical inner section 125 of the stator assembly 104. The bearing 146 maintains the stator assembly 104 in a stationary position while allowing the rotor 106 to rotate.

A conductive layer 150 having a specified thickness 154 is disposed between the generally cylindrical inner surface 120 of the rotor 106 and an outer end 158 of the field winding 142. The conductive layer 150 may be made of a variety of conductive materials, but is preferably made of copper or nickel. The specified thickness 154 of the conductive layer may range from 0.25 mm to 2 mm. The conductive layer 150 is attached to the generally cylindrical inner surface 120 of the rotor 106. A wide variety of attachment mechanisms may be utilized, however, the conductive layer is preferably brazed to the generally cylindrical inner surface 120 of the rotor 106. A generally cylindrical gap 160 is defined by outer ends 162 of the stator arms 126 and the conductive layer 150.

In operation, the rotor 106 and conductive layer 150 rotate in one direction, and a current 164 flows through the field winding 142. The winding 142 alternates to create alternating north and south poles, 166 and 170, between the stator arms 126, thereby creating a generally cylindrical electromagnet 174. The generally cylindrical electromagnet 174 induces a magnetic field 178 (also referred to as a magnetomotive force). The magnetic fields extend from each north pole 166, across the gap 160 between the outer ends 162 of the stator arms 126 and the conductive layer 150, and then back into each south pole 170. Because the rotor 106 is moving relative to the stator assembly 104, which is stationary, the rotor 106 and conductive layer 150 are submitted to a periodically varying magnetic field due to the alternating north and south poles 166 and 170. The periodically varying magnetic field induces eddy currents in the rotor 106 and conductive layer 150. The induced current in the rotor 106 and conductive layer 150 creates heat due to the resistance of the metal. The heat creates braking torque which acts to slow down rotation of the rotor 106 and conductive layer 150.

It is important to note that the presence of the conductive layer 150 acts to increase torque on the rotor 106, because the conductive layer is more conductive than the iron rotor 106, thereby inducing more eddy current in the rotor 106 and conductive layer 150. As a result, the increase in eddy current due to the presence of the conductive layer results in more heat due to the resistance of the metal. This leads to an increased level of torque thereby further slowing down rotation of the rotor 106 and conductive layer 150.

Figure 3:
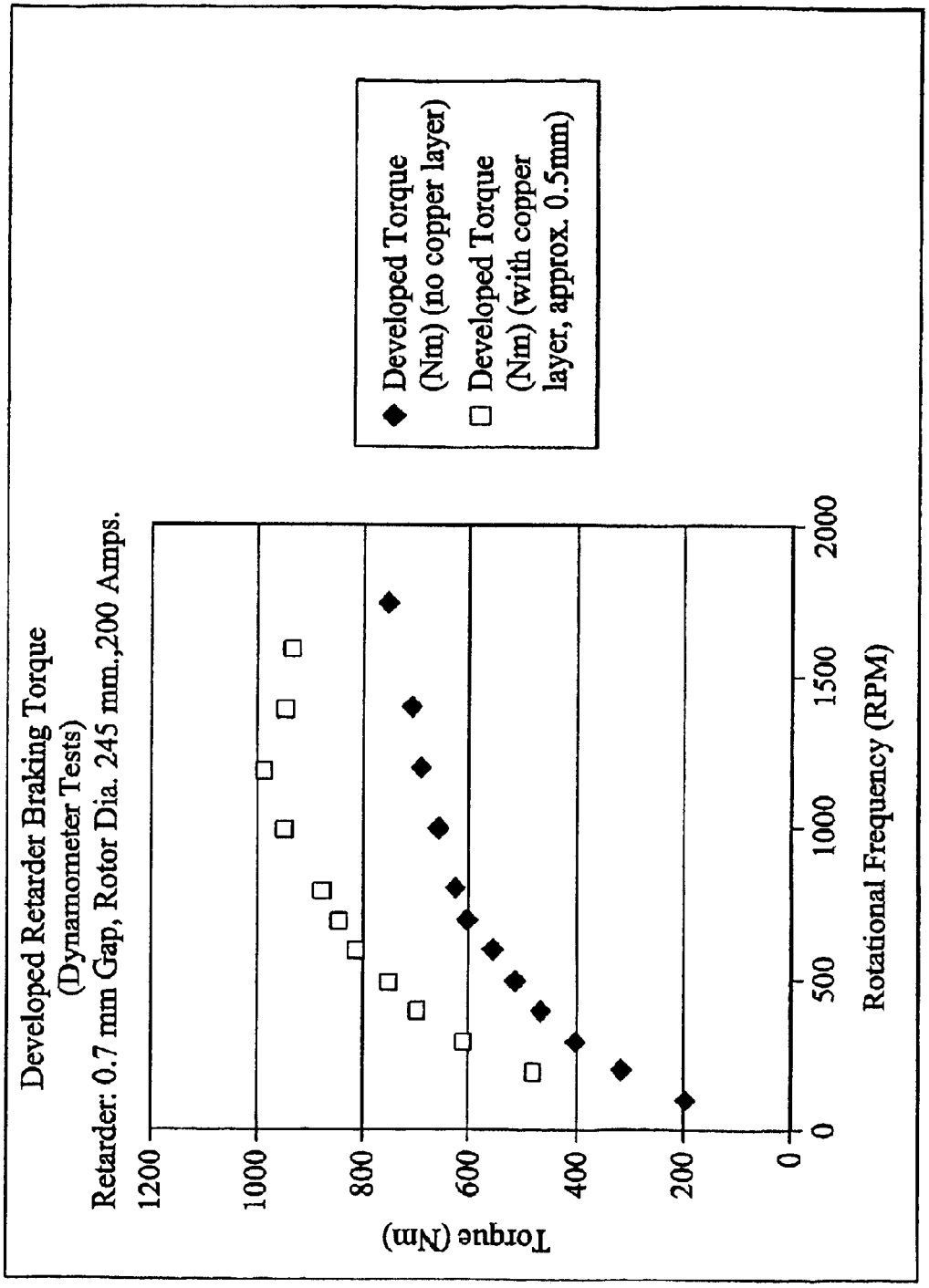
FIG. 3 is a graph showing experimental results for a retarder brake with and without a copper conductive layer attached to a rotor.

FIG. 3 sets forth test results establishing that the presence of a copper conductive layer provides approximately 30% increased torque on the rotor, at low rotational frequencies, over a retarder brake without a conductive layer. Further, the test results show that the peak torque of the conductive layer is shifted down in frequency in comparison with the peak torque of the retarder brake without a conductive layer. As shown, the torque decreases steadily to zero as the rotational frequency decreases. The retarder has no torque at zero speed regardless of the presence of a conductive layer. The shift in the speed position of the peak torque is beneficial because retarder brakes operate at a wide range of frequencies from several thousand RPM down to zero RPM during a braking event. However, the lower the frequency to which the retarder brake applies reasonable amounts of torque, the more useful the retarder.

Figure 4:
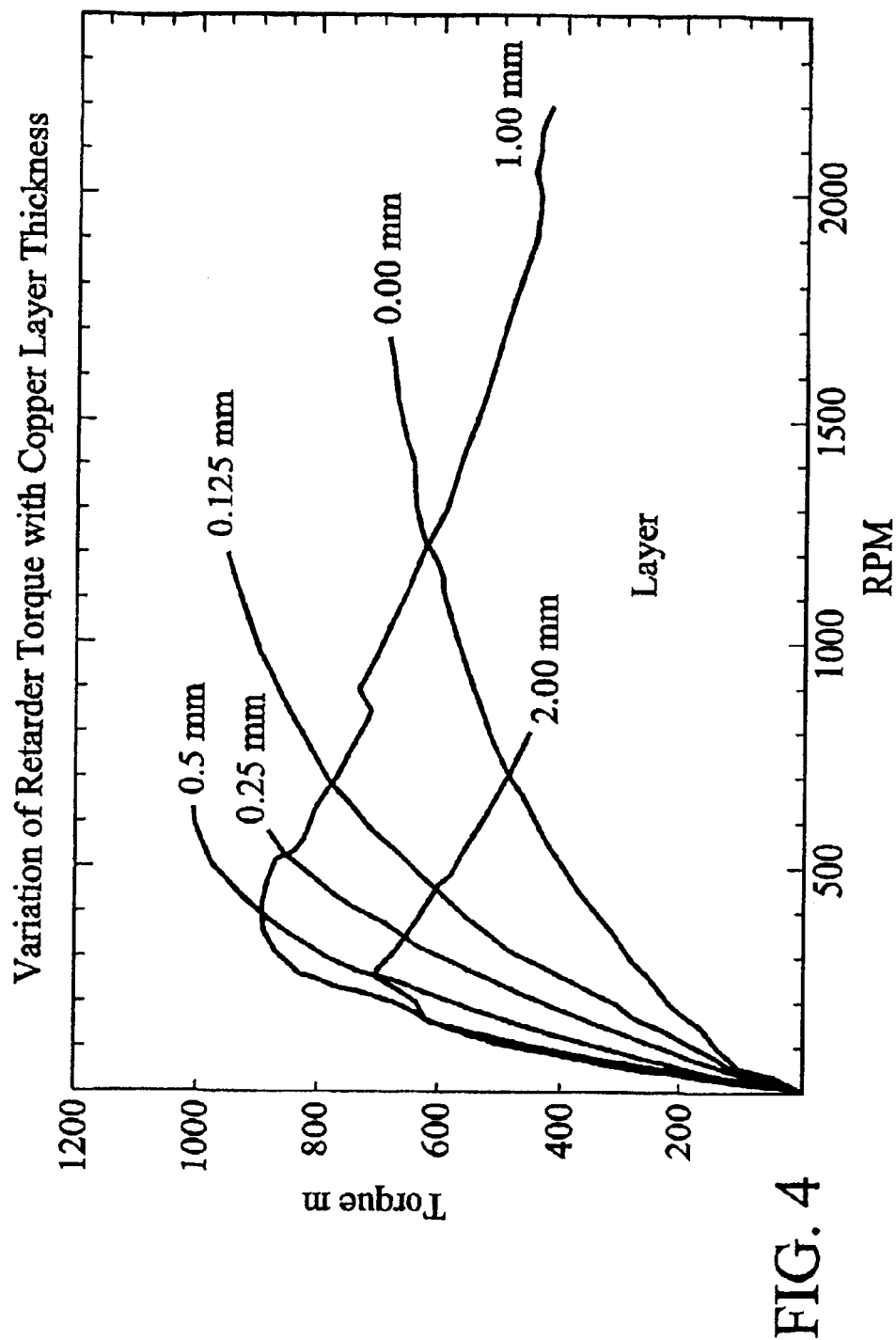
FIG. 4 is a graph showing experimental results for a retarder brake with different thickness copper conductive layers attached to a rotor.

FIG. 4 sets forth simulation results for a specific example demonstrating that there is an optimal thickness for the conductive layer that maximizes torque at some frequency. As a result, the specified thickness of the conductive layer may be determined with finite element analysis to provide a certain desired torque at a certain desired low rotational frequency. This is beneficial because it allows different retarder brake systems to obtain different desired torques at different desired low rotational frequencies, depending on the required use of each system.

Figure 5:
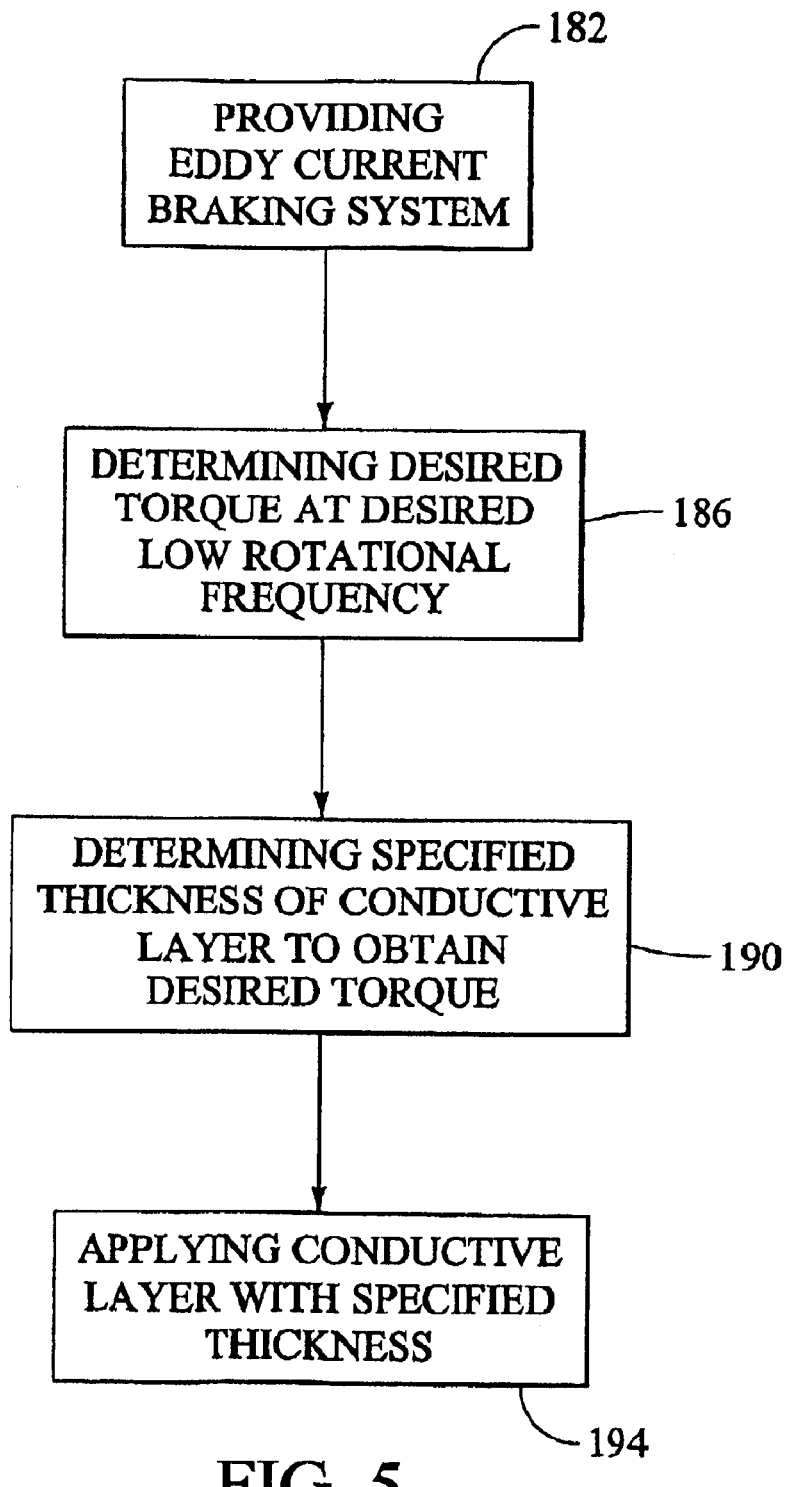
FIG. 5 is a flow diagram illustrating one exemplary method in accordance with the present invention.

FIG. 5 shows a method for obtaining a certain desired torque at a certain desired rotational frequency in an eddy current braking system in a vehicle. First, an eddy current braking system 182 is provided. The eddy current braking system comprises a rotating rotor defining a generally cylindrical inner pocket extending axially along the rotor, a stator assembly including a winding at least partially disposed within the generally cylindrical inner pocket of the rotor, and a conductive layer having a specified thickness disposed between an inner surface of the rotor and the winding. The winding is capable of inducing a magnetomotive force (or eddy current) capable of slowing the rotation of the rotor. Second, a certain desired torque at a certain desired low rotational frequency is determined 186. The certain desired torque at the certain desired low rotational frequency may vary depending on the required use of the system. Third, the specified thickness of the conductive layer is determined to obtain the certain desired torque at the certain desired low rotational frequency 190. Preferably, this determination is made utilizing finite element analysis. Finally, the conductive layer with the determined specified thickness is applied to obtain the certain desired torque at the certain desired low rotational frequency 194. Preferably, the conductive layer is applied by attaching it, through a brazing process, to the generally cylindrical inner surface of the rotor.

Utilizing this method, a certain desired torque at a certain desired low rotational frequency may be obtained by determining and applying a specified thickness of the conductive layer. As such, the optimal torques in different eddy current braking systems in different vehicles may be obtained to achieve different desired torques at different rotational frequencies in each system.

It is to be understood that the invention is not to be limited to the exact construction and/or method which has been illustrated and discussed above, but that various changes and/or modifications may be made without departing from the spirit and the scope of the invention.

What is claimed is:

1. An eddy current braking system in a vehicle comprising:

a rotor defining a generally cylindrical inner pocket extending axially along the rotor;

a stator assembly at least partially disposed within the generally cylindrical inner pocket of the rotor, the stator assembly comprising a winding, the winding capable of inducing a magnetomotive force capable of slowing rotation of the rotor; and a conductive layer having a thickness in the range of about 0.125 mm to 2 mm disposed between an inner surface of the rotor and the winding, wherein at said thickness, a rotational frequency in the range of a bout 200 revolutions per minute to approximately 2000 revolutions per minute, a torque larger than about 200 Nm is produced on the rotor.

2. The invention of claim 1 wherein the stator assembly further comprises a generally cylindrical inner section, and staggered outwardly extending stator arms connected to and extending around a circumference of an outer-surface of the generally cylindrical inner section.

3. The invention of claim 2 wherein the winding is disposed within inner compartments, defined by the outer surface and the staggered outwardly extending stator arms, the inner compartments staggered around the circumference of the outer-surface of the generally cylindrical inner section.

4. The invention of claim 1 wherein the winding comprises one of a round wire and a rectangular wire.

5. The invention of claim 1 wherein the rotor is operable to generate an armature magnetomotive force.

6. The invention of claim 1 wherein the rotor comprises a shaft.

7. The invention of claim 1 wherein the conductive layer is one of copper and nickel.

8. The invention of claim 1 wherein the conductive layer is attached to a generally cylindrical inner surface of the rotor.

9. The invention of claim 8 wherein the conductive layer is brazed to the generally cylindrical inner surface of the rotor.

10. The invention of claim 1 wherein the conductive layer acts to increase torque on the rotor at rotational frequencies in the range of about 200 revolutions per minute to approximately 2000 revolutions per minute by approximately 30 percent.

11. The invention of claim 1 wherein the thickness of the conductive layer is determined using finite element analysis to obtain the torque at the rotational frequency.

12. A method of obtaining a certain desired torque at a certain desired low rotational frequency in an eddy current braking system in a vehicle, the method comprising:

providing an eddy current braking system comprising a rotor defining a generally cylindrical inner pocket extending axially along the rotor, a stator assembly at least partially disposed within the generally cylindrical inner pocket of the rotor, the stator assembly comprising a winding, the winding capable of inducing a magnetomotive force capable of slowing rotation of the rotor, and a conductive layer having a specified thickness disposed between an inner surface of the rotor and the winding;

determining a certain desired torque at a certain desired low rotational frequency, wherein the certain desired torque is larger than about 200 Nm and the certain desired low rotational frequency is in the range of about 200 revolutions per minute to approximately 2000 revolutions per minute;

determining the specified thickness of the conductive layer to obtain the certain desired torque at the certain desired low rotational frequency, wherein the specified thickness is in the range of about 0.125 mm to 2 mm; and applying the conductive layer, with the determined specified thickness, to obtain the certain desired torque at the certain desired low rotational frequency.

13. The method of claim 12 wherein the conductive layer is one of copper and nickel.

14. The invention of claim 12 wherein the conductive layer is attached to a generally cylindrical inner surface of the rotor.

15. The invention of claim 14 wherein the conductive layer is brazed to the generally cylindrical inner surface of the rotor.

16. The invention of claim 12 wherein the conductive layer acts to increase torque on the rotor at rotational frequencies in the range of about 200 revolutions per minute to approximately 2000 revolutions per minute by approximately 30 percent.

17. The invention of claim 12 wherein the specified thickness of the conductive layer is determined using finite element analysis to obtain the certain desired torque at the certain desired low rotational frequency.

* * * * *

UNITED STATES PATENT AND TRADEMARK OFFICE
CERTIFICATE OF CORRECTION

| | | |
|---|---|---|
| PATENT NO. | : 6,900,569 B2 | Page 1 of 1 |
| APPLICATION NO. | : 10/244989 | |
| DATED | : May 31, 2005 | |
| INVENTOR(S) | : Randy C. Stevenson et al. | |

It is certified that error appears in the above-identified patent and that said Letters Patent is hereby corrected as shown below:

In the Claims

Column 5, in claim 1, line 9, after "in the range of" delete "a bout" and substitute --about-- in its place.

Signed and Sealed this

Fourteenth Day of November, 2006

JON W. DUDAS
*Director of the United States Patent and Trademark Office*